(12) United States Patent
Desy

(10) Patent No.: US 6,854,958 B2
(45) Date of Patent: Feb. 15, 2005

(54) HYDRAULIC TURBINE WITH ENHANCED DISSOLVED OXYGEN

(75) Inventor: Normand Desy, Laval (CA)

(73) Assignee: General Electric Canada Inc., Mississauga (CA)

(*) Notice: Subject to any disclaimer, the term of this patent is extended or adjusted under 35 U.S.C. 154(b) by 49 days.

(21) Appl. No.: 10/615,261

(22) Filed: Jul. 9, 2003

(65) Prior Publication Data

US 2005/0008475 A1 Jan. 13, 2005

(51) Int. Cl.⁷ ................................................ F01D 11/02
(52) U.S. Cl. .................. 415/116; 415/110; 415/168.2; 415/173.6; 415/174.5
(58) Field of Search ................ 415/115–116, 170.1, 415/110–112, 173.6, 173.1, 173.3, 173.5, 174.2, 174.5, 168.2, 168.3, 168.4; 60/686, 689, 696; 261/37, 91, 93, DIG. 75

(56) References Cited

U.S. PATENT DOCUMENTS

| | | | |
|---|---|---|---|
| 2,851,289 A | * | 9/1958 | Pedersen .................. 415/174.5 |
| 3,172,640 A | * | 3/1965 | Sproule .................... 415/173.6 |
| 3,174,719 A | * | 3/1965 | Sproule et al. ............. 415/110 |
| 3,360,238 A | * | 12/1967 | Koeller .................... 415/174.5 |
| 3,724,966 A | | 4/1973 | Sproule |
| 4,142,825 A | | 3/1979 | Koeller |
| 4,142,826 A | | 3/1979 | Koeller |
| 4,146,351 A | | 3/1979 | Koeller |
| 4,780,051 A | | 10/1988 | Fisher, Jr. |
| 5,653,577 A | * | 8/1997 | Wuhrer ....................... 415/110 |
| 5,823,740 A | | 10/1998 | Cybularz et al. |
| 5,879,130 A | | 3/1999 | Beyer et al. |
| 5,896,657 A | | 4/1999 | Beyer et al. |
| 5,924,842 A | | 7/1999 | Beyer et al. |
| 5,924,844 A | | 7/1999 | Cybularz et al. |
| 5,941,682 A | | 8/1999 | Cybularz et al. |
| 6,095,749 A | | 8/2000 | Beyer et al. |
| 6,155,783 A | | 12/2000 | Beyer |
| 6,247,893 B1 | | 6/2001 | Beyer et al. |
| 6,454,533 B2 | | 9/2002 | Beyer |

FOREIGN PATENT DOCUMENTS

FR 2809139 11/2001
SU 1263902 A1 10/1986

* cited by examiner

Primary Examiner—Christopher Verdier

(57) ABSTRACT

A hydraulic turbine is adapted to introduce oxygen into a water flowing through a water passageway of a turbine. The turbine has a circumferential chamber formed between a rotating band and a stationary discharge ring. The chamber has a gas admission aperture for receiving an oxygen containing gas into the chamber. A downstream end portion of the band has a plurality of spaced apart vanes providing chamber outlet passageways between the vanes and through the band. The vanes are configured to rotate with the band and to draw the oxygen containing gas and water from the chamber through the outlet passageways in the band and into the water passageway.

27 Claims, 3 Drawing Sheets

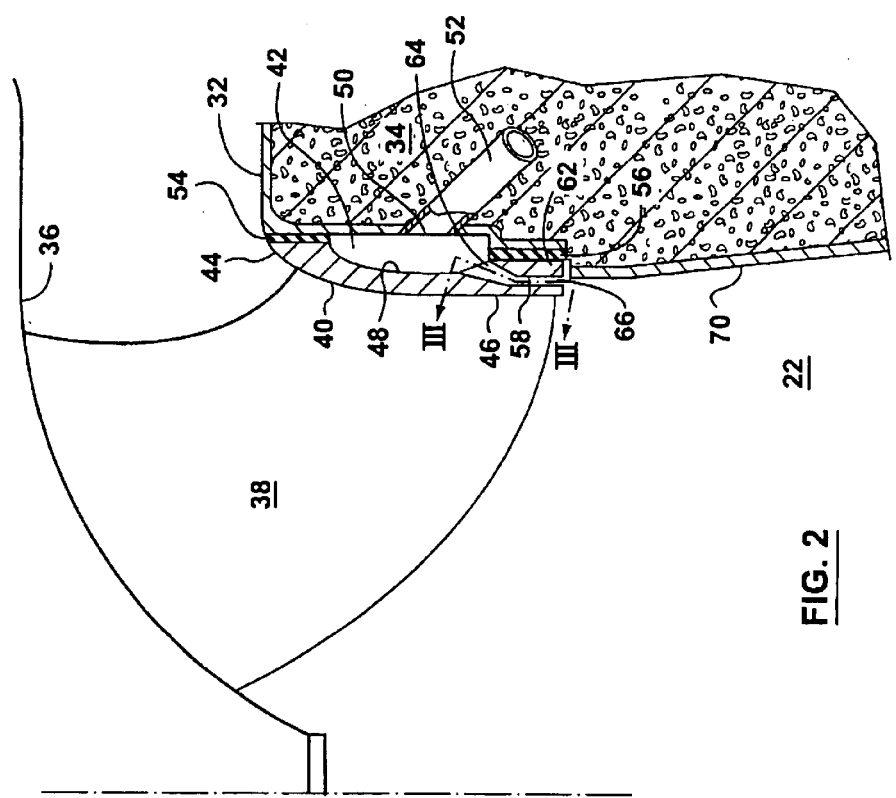

HYDRAULIC TURBINE WITH ENHANCED DISSOLVED OXYGEN

FIELD OF THE INVENTION

The present invention relates to a hydraulic turbine and, in particular, to a turbine adapted to increase the dissolved oxygen content of water flowing through the turbine.

BACKGROUND OF THE INVENTION

The oxygen levels of water discharged from hydraulic turbines used in hydroelectric installations have been known to provide an environmental problem due to the discharged water having relatively low levels of dissolved oxygen. The problem is more predominant in the summer months. During the summer months, thermal stratification of water in an upstream water reservoir creates warmer water near the surface having relatively high dissolved oxygen and colder water near the bottom of the reservoir having relatively lower dissolved oxygen. Because the water utilized by the turbines is usually taken from the bottom of the reservoir, this water presents a potentially environmental hazard when discharged downstream by the turbines.

In the building of new hydroelectric installations and the refurbishing of existing hydroelectric installations, there is an opportunity to improve the level of dissolved oxygen in the water by introducing oxygen to the water as it passes through the turbine. It is known to admit air through one or more runner blades in the turbine as disclosed in U.S. Pat. No. 5,879,130 issued Mar. 9, 1999; U.S. Pat. No. 5,896,657 issued Apr. 27, 1999; U.S. Pat. No. 5,924,842 issued Jul. 20, 1999; U.S. Pat. No. 6,155,783 issued Dec. 5, 2000; U.S. Pat. No. 6,247,893 issued Jun. 19, 2001, and U.S. Pat. No. 6,454,533 issued Sep. 24, 2002. However, each of these turbines requires introducing air through at least one of the moveable turbine runner blades. This requires complex blade manufacture and the introduction of air through a moving part.

It is also known to admit air around a Francis turbine band as disclosed in U.S. Pat. No. 5,823,740 issued Oct. 20, 1998. The turbine has a rotatably mounted runner having a band, a stationary discharge ring and a seal between the band and the discharge ring. While the band seal limits water leakage into a band mixing chamber formed between the runner band and the stationary discharge ring, the mixing chamber is substantially flooded with water during turbine operation. An oxygen containing gas is injected into the chamber through a gas admission aperture located near the seal. The mixing chamber is configured to promote mixing of the oxygen containing gas and water leaking into the chamber. The gas and water mixture is then discharged through an outlet port between the discharge ring and the runner band. However, by having the chamber substantially flooded with water, the amount of oxygen introduced into the water flowing through the turbine is limited.

Accordingly, there is a need for improving the transfer of an oxygen containing gas into the turbine water passageway from a chamber surrounding the runner band where the chamber is substantially unflooded.

SUMMARY OF THE INVENTION

The present invention relates to a hydraulic turbine adapted to introduce oxygen into the water flowing through the water passageway of the turbine. This is accomplished by having a circumferential chamber positioned between a stationary discharge ring of the turbine and a rotating band of the turbine runner. The chamber has a gas admission aperture for receiving an oxygen containing gas into the chamber. The band has a plurality of spaced apart vanes that provide chamber outlet passageways that extend between the vanes. The vanes are configured to rotate with the band and draw the oxygen containing gas and any water leaked into the chamber through the outlet passageways and into the water passageway of the turbine.

The vanes, when rotating with the band, act as fan blades that draw or induce the flow of oxygen containing gas from the chamber into the water turbine passageway thereby increasing the dissolved oxygen content of the water flowing through the turbine. This inducement of air flow out of the chamber permits for large air content in the mixture of water and air in the chamber and thereby improves the content of air or oxygen introduced into the water passageway.

The circumferential chamber is formed between the rotating band and the stationary discharge ring and extends around the rotating band. The rotating band may be configured or shaped with a recess in its outer wall to enhance the size of the chamber. Further, the stationary discharge ring may be also shaped along its outer confronting wall to the band in a manner that the chamber is enlarged to increase the volume of oxygen containing gas received within the chamber.

The turbine has an upper seal positioned between the band and the stationary discharge ring to limit water leakage into the circumferential chamber. This seal is configured in one embodiment such that the circumferential chamber remains substantially unflooded during turbine operation. By substantially unflooded it is meant that the volume of water in the chamber is less than 50% of the volume of the chamber, and preferably the volume of water is in the range of about 20% to 30% of the volume of the chamber. By having the circumferential chamber, or manifold, substantially unflooded, the oxygen content of gas dissolved into the water passageway of the turbine is increased. A lower seal is positioned adjacent the downstream end portion of the band between the band and the stationary discharge ring to reduce undesirable recirculation of water and oxygen containing gas from the adjacent area underneath the runner band.

In one embodiment, the top seal is a tighter seal than the lower seal due to the pressure differential adjacent the top seal being higher than that adjacent the lower seal. This further induces any oxygen containing gas and water mixture contained within the chamber to flow towards the bottom seal and, in particular, flow out through the plurality of outlet passageways in the band.

In another embodiment, the downstream end portion of the band has a circumferential band portion that surrounds the vanes whereby the outlet passageways of the band are contained within and extend through the lower band portion. Further, the lower seal is disposed between the circumferential band portion and the stationary ring portion. Alternatively, the lower seal may be positioned directly adjacent to the vanes and the outlet passageways extend between the band and the lower seal.

The turbine further includes a draft tube downstream of the turbine runner and the band. The draft tube has an inner diameter wall adjacent the band. The outlet passageways of the downstream band portion adjacent the water passageway are positioned inwardly of the inner wall of the draft tube adjacent the band. This permits for oxygen containing gas to enter the water passageway with no restrictions from the top of the draft tube. The outlet passageways pass through the downstream end portion of the band and have inlet openings and discharge openings. The inlet openings communicate with the chamber and the discharge openings communicate with the water passageway.

In accordance with the present invention there is provided a hydraulic turbine adapted to introduce oxygen into water flowing through a water passageway of a turbine. The turbine comprises a rotatably mounted runner having a crown, a band substantially concentric with the crown, and a plurality of runner blades extending between the crown and the band. The band has an upstream end portion and a downstream end portion. The turbine has a stationary discharge ring substantially concentric with the band and spaced outwardly therefrom. The turbine has a circumferential chamber formed between the band and the stationary discharge ring. The chamber has a gas admission aperture for receiving an oxygen containing gas into the chamber. The turbine has an upper seal positioned adjacent the upstream end portion of the band between the band and the stationary discharge ring to limit water leakage into a circumferential chamber. The turbine has a lower seal positioned adjacent the downstream end portion of the band between the band and the stationary discharge ring to reduce undesirable recirculation of water from downstream back to the chamber between the band and the stationary discharge ring. The downstream end portion of the band has a plurality of spaced apart vanes providing chamber outlet passageways between the vanes in fluid communication with the circumferential chamber and the water passageway. The vanes are configured to rotate with the band and draw the oxygen containing gas and water from the chamber, through the outlet passageways and into the water passageway.

BRIEF DESCRIPTION OF THE DRAWINGS

For a better understanding of the nature and objects of the present invention reference may be had to the accompanying diagrammatic drawings in which:

FIG. 2 is an enlarged partial sectional view showing the Francis turbine of FIG. 1;

FIG. 3 is a view of the band showing the vanes and outlet passageways along line III—III of FIG. 2; and, FIG. 4 is a view similar to FIG. 2 showing an alternative embodiment.

DETAILED DESCRIPTION OF THE INVENTION

The present invention relates to a hydraulic turbine and, in particular, to a turbine adapted to increase the dissolved oxygen content of water discharged from the turbine.

Figure 1:
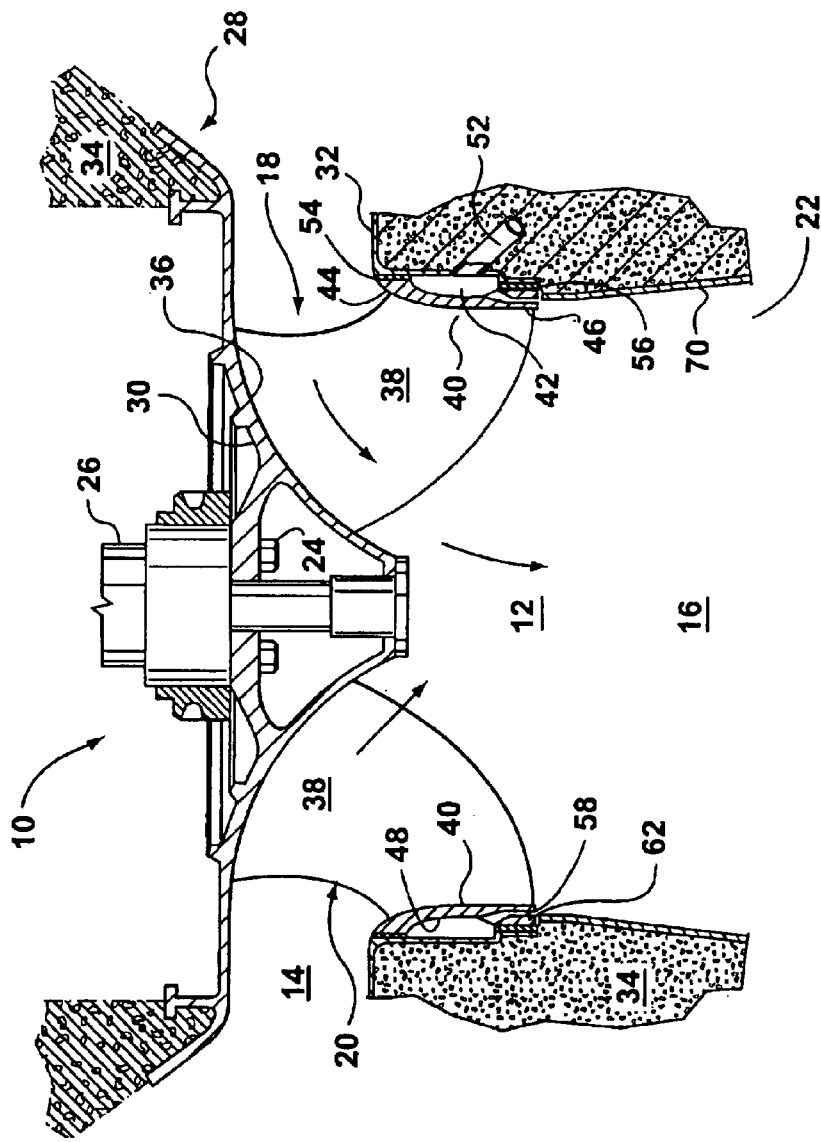
FIG. 1 is an elevational view, partially in cross-section, of a Francis turbine adapted to increase the dissolved oxygen content of water flowing through the turbine.

Referring to FIGS. 1 and 3, a turbine installation 10 is illustrated for use in the generation of hydroelectricity. The installation 10 has a water passageway 12. Water flows from an inlet 14 of passageway 12 to an outlet 16 located at a lower elevation. The water passageway 12 passes through a Francis turbine 18 having a runner 20 and a draft tube 22. The runner 20 is secured by bolts 24 to a shaft 26 transmitting energy to a generator (not shown). The turbine 18 is mounted in a stationary casing 28 having a head cover 30 and a bottom stationary discharge ring 32. The head cover 30, discharge ring 32 and draft tube 22 are embedded in concrete foundation 34.

Runner 20 is rotatably mounted in casing 28 and has a crown 36 and a plurality of circumferentially spaced runner blades 38 extending therefrom to an enclosing band 40. Band 40 is concentric with crown 36.

It should be understood that installation 10 includes other components such as, for example, stay vanes and wicket gates which are not shown.

A circumferential chamber 42 is located between the band 40 and the stationary discharge ring 32. Chamber 42 extends around the outside of band 40. The band 40 is shown to have an upstream end portion 44 and a downstream end portion 46. The band 40 further has an outer wall 48 that is configured with a recess to increase the volume of chamber 42. The chamber 42 has a gas admission aperture 50 connected to a gas supply line 52 through which a supply of oxygen containing gas or ambient air may pass either under pressure or at ambient pressure into chamber 42. In one embodiment the oxygen containing gas is air.

In order to limit the flooding of the chamber 42 with water passing between the band 40 and the stationary discharge ring 32, an upper seal 54 is positioned adjacent the upstream end portion 44 of the band 40 between the band 40 and the stationary discharge ring 32. This seal 54 acts to limit water leakage into the circumferential chamber 42. In one embodiment, the seal is effective such that the circumferential chamber remains substantially unflooded. By substantially unflooded it is meant that at least 50 percent or more of the chamber is unflooded with water at any given time during turbine operation and preferably the volume of water is in the range of about 20% to 30% of the volume of the chamber. The seal 54 works such that 70% to 80% of the chamber 42 is unflooded with water at any given time.

A lower seal 56 is positioned adjacent the downstream end portion 46 of band 40 between the band 40 and the stationary discharge ring 32. This seal is provided to reduce the undesirable escape of oxygen containing gas and water from the chamber between the band 40 and the stationary discharge ring 32. It should be understood that the tightness or the effectiveness of seal 56 is chosen to be less effective from a seal perspective than the seal 54 such that there is a natural tendency for any oxygen or gas contained in the chamber 42 to flow towards the seal 56 away from seal 54.

The downstream end portion 46 of band 40 has a plurality of outlet passageways 58 (see FIG. 3) spaced between vanes 60. Vanes 60 extend radially outward of the downstream end portion 46 of the band 40 and are sloped to provide a fan effect. In the embodiment shown in FIG. 2, the vanes 60 extend into and contact a circumferential band portion 62. In this way, the passageways 58 are self contained within the downstream end portion 46 of the band 40.

As shown in FIG. 3, each of the outlet passageways 58 of the downstream end portion 46 of the band 40 has an inlet opening 64 which communicates with the chamber 42 and also has a discharge opening 66 which communicates with the water passageway 12. As the band 40 rotates in the direction of arrow 63 shown in FIG. 3, the vanes 60 act as fan blades to draw oxygen containing gas and water from chamber 42 in through inlet openings 64 through passageways 58 between the vanes 60, and out the discharge openings 66 into the water passageway 12.

In the embodiment shown in FIG. 2, the outlet passageways 58 extend in the downstream direction associated with the flow of water through the water passageway 12. The passageways 58 further extend radially inwardly of the band 40 such that the discharge openings 66 are located within or radially inward of the inner wall 70 of the draft tube 22. This results in the oxygen containing gas being discharged into the water passageway 12 un-encumbered by the upper end of the draft tube 22.

The size and number of the vanes 60, and the sloping orientation of the vanes 60 as shown in FIG. 3, are chosen to provide the desired fan effect to suction or draw the oxygen containing gas and water from chamber 42 at a rate sufficient to provide sufficient dissolved oxygen content in the water passageway 12. The self containing of the outlet passageways 58 and vanes 60 within the lower end portion 46 of the band 40 provides a self venting feature through the band 40.

Figure 4:
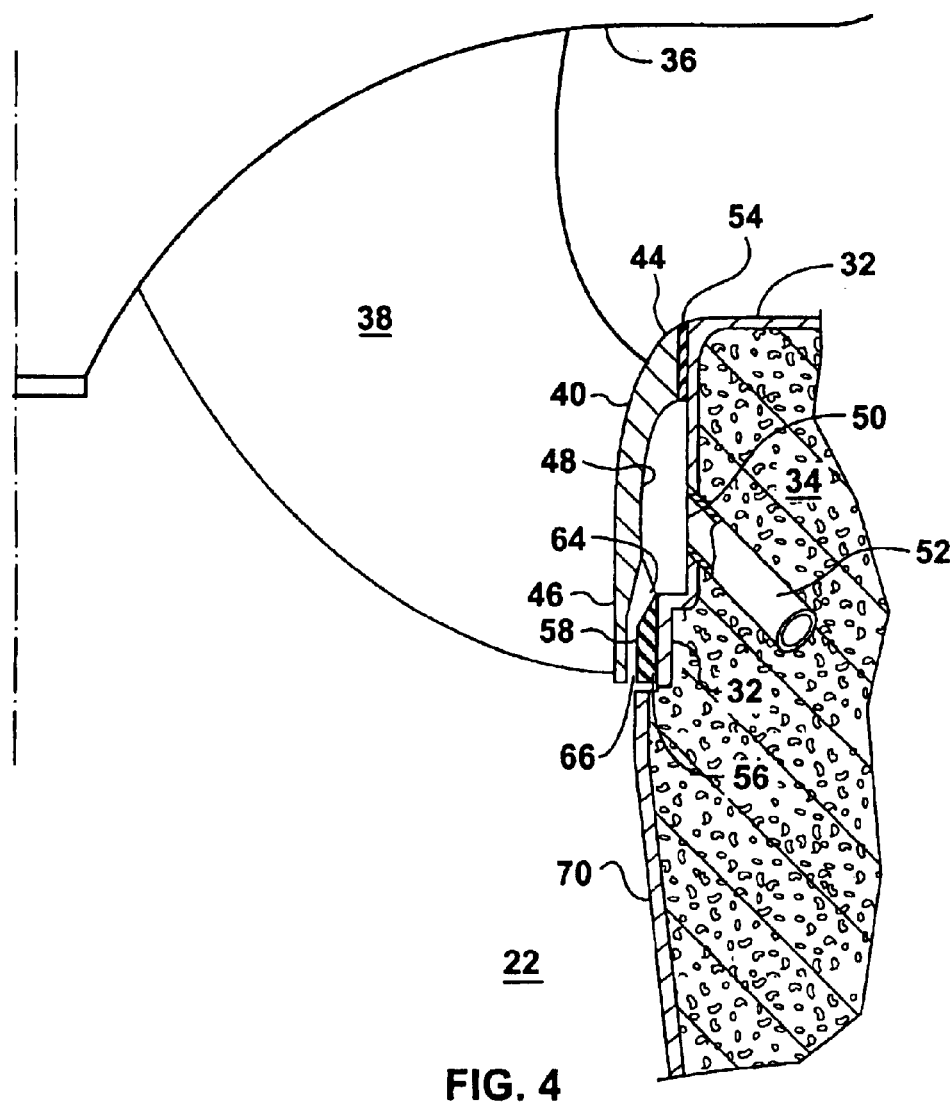

Referring to FIG. 4 an alternative embodiment is shown wherein the downstream end portion 46 of the band 40 does not have a circumferential band portion 62 as shown in FIG. 2. Instead, in FIG. 4, the lower seal 56 is mounted to the discharge ring 32 so that the seal 56 is directly adjacent the vanes 60. It should be understood that there may be a slight gap between the vanes 60 and the seal 56. In the alternative embodiment, the rotation of the band 40 result in the rotation of the vanes 60 so as to draw water and oxygen from the chamber 42 through the outlet passageways 56 located between the vanes 60. In this embodiment however, the radial outer boundary of the outlet passageways 58 is defined by the lower seal 56 and not the circumferential band portion 62 as shown in FIG. 2.

While the invention has been described in connection with what is presently considered to be a embodiment, it is to be understood that the invention is not to be limited thereto, but on the contrary, is intended to cover various modifications and equivalent arrangements included within the spirit and scope of the appended claims.

What is claimed is:

1. A hydraulic turbine adapted to introduce oxygen into water flowing through a water passageway of the turbine, the turbine comprising:
   a rotatably mounted runner having a crown, a band substantially concentric with the crown, and a plurality of runner blades extending between the crown and the band, the band having an upstream end portion and a downstream end portion;
   a stationary discharge ring substantially concentric with the band and spaced outwardly therefrom;
   a circumferential chamber formed between the band and the stationary discharge ring, the circumferential chamber having a gas admission aperture for receiving an oxygen containing gas into the chamber;
   an upper seal positioned adjacent the upstream end portion of the band between the band and the stationary discharge ring to limit water leakage into the circumferential chamber;
   a lower seal positioned adjacent the downstream end portion of the band between the band and the stationary discharge ring to reduce undesirable escape of oxygen containing gas and water from the chamber between the band and the stationary discharge ring; and,
   the downstream end portion of the band having a plurality of spaced apart vanes providing outlet passageways between the vanes in fluid communication with the circumferential chamber and the water passageway, the vanes being configured to rotate with the band and draw the oxygen containing gas and water from the chamber through the outlet passageways and into the water passageway.

2. The hydraulic turbine of claim 1 wherein the lower seal is positioned directly adjacent the vanes and the outlet passageways extend between the band and the lower seal.

3. The hydraulic turbine of claim 1 wherein the downstream end portion of the band has a circumferential band portion surrounding the vanes whereby the outlet passageways are contained within and extend through the downstream end portion, and the lower seal being disposed between the circumferential band portion and the stationary discharge ring.

4. The hydraulic turbine of claim 1 wherein the oxygen containing gas is ambient air.

5. The hydraulic turbine of claim 4 wherein the ambient air is supplied under pressure.

6. The hydraulic turbine of claim 2 wherein the oxygen containing gas is ambient air.

7. The hydraulic turbine of claim 6 wherein the ambient air is supplied under pressure.

8. The hydraulic turbine of claim 3 wherein the oxygen containing gas is ambient air.

9. The hydraulic turbine of claim 8 wherein the ambient air is supplied under pressure.

10. The hydraulic turbine of claim 1 wherein the turbine further includes a draft tube downstream of the band, the draft tube having an inner wall adjacent the band, and the outlet passageways of the downstream end portion adjacent the water passageway being positioned inwardly of the inner wall of the draft tube adjacent the band.

11. The hydraulic turbine of claim 1 wherein the outlet passageways passing through the downstream end portion of the band have inlet openings and discharge openings, the inlet openings communicating with the chamber and the discharge openings communicating with the water passageway.

12. The hydraulic turbine of claim 2 wherein the outlet passageways passing through the downstream end portion of the band have inlet openings and discharge openings, the inlet openings communicating with the chamber and the discharge openings communicating with the water passageway.

13. The hydraulic turbine of claim 3 wherein the outlet passageways passing through the downstream end portion of the band have inlet openings and discharge openings, the inlet openings communicating with the chamber and the discharge openings communicating with the water passageway.

14. The hydraulic turbine of claim 1 wherein the upper seal is configured such that the circumferential chamber remains substantially unflooded during turbine operation.

15. The hydraulic turbine of claim 14 wherein the upper seal is configured to maintain a volume of water in the circumferential chamber in the range of about 20% to 30% of the total volume of the chamber.

16. The hydraulic turbine of claim 14 wherein the lower seal is positioned directly adjacent the vanes and the outlet passageways extend between the band and the lower seal.

17. The hydraulic turbine of claim 14 wherein the downstream end portion of the band has a circumferential band portion surrounding the vanes whereby the outlet passageways are contained within and extend through the downstream end portion, and the lower seal being disposed between the circumferential band portion and the stationary discharge ring.

18. The hydraulic turbine of claim 14 wherein the oxygen containing gas is ambient air.

19. The hydraulic turbine of claim 18 wherein the ambient air is supplied under pressure.

20. The hydraulic turbine of claim 16 wherein the oxygen containing gas is ambient air.

21. The hydraulic turbine of claim 20 wherein the ambient air is supplied under pressure.

22. The hydraulic turbine of claim 17 wherein the oxygen containing gas is ambient air.

23. The hydraulic turbine of claim 22 wherein the ambient air is supplied under pressure.

24. The hydraulic turbine of claim 14 wherein the turbine further includes a draft tube downstream of the band, the draft tube having an inner wall adjacent the band, and the outlet passageways of the downstream end portion adjacent the water passageway being positioned inwardly of the inner wall of the draft tube adjacent the band.

25. The hydraulic turbine of claim 14 wherein the outlet passageways passing through the downstream end portion of the band have inlet openings and discharge openings, the inlet openings communicating with the chamber and the discharge openings communicating with the water passageway.

26. The hydraulic turbine of claim 16 wherein the outlet passageways passing throughout the downstream end portion of the band have inlet openings and discharge openings, the inlet openings communicating with the chamber and the discharge openings communicating with the water passageway.

27. The hydraulic turbine of claim 17 wherein the outlet passageways passing through the downstream end portion of the band have inlet openings and discharge openings, the inlet openings communicating with the chamber and the discharge openings communicating with the water passageway.

* * * * *